United States Patent Office 3,786,134
Patented Jan. 15, 1974

3,786,134
PROCESS FOR PRODUCING HOLLOW
CARBON MICROSPHERES
Yasuo Amagi, Zenya Shiiki, Yukihiko Ohsumi, and Kazuo Noguchi, Tokyo, Japan, assignors to Kureha Kagaku Kogyo Kabushiki Kaisha, Tokyo, Japan
No Drawing. Filed May 27, 1971, Ser. No. 147,712
Claims priority, application Japan, May 29, 1970, 45/45,625
Int. Cl. C01b 31/02
U.S. Cl. 423—449     14 Claims

ABSTRACT OF THE DISCLOSURE

Hollow microspheres of carbon are obtained by homogeneously mixing a hard, highly aromatic pitch having a softening point of 60–350° C., a 0–25% nitrobenzene-insoluble moiety and a H/C ratio of 0.2–1.0 with an organic solvent having a low boiling point and being compatible with the pitch, dispersing the mixture into water in the presence of a protective colloid, adjusting the content of the solvent in the resulting microspheres to 0.2–10%, and then flash-heating said microspheres whereby the solvent therein functions as blowing agent to form hollow pitch microspheres.

Subsequently, the hollow microspheres of pitch are rendered infusible by heating them with an oxidizing fluid, gas or liquid, and baked to carbonization at a temperature of 600–2000° C. in an inert atmosphere. The resulting microspheres of carbon are excellently resistant to heat, chemicals and radioactive rays and are thus suitable as high-temperature heat-insulators, warming material, structural material for atomic piles, composite materials with metals, inorganics and plastics.

FIELD OF THE INVENTION

This invention relates to a process for the production of hollow carbon microspheres wherein a special pitch is used as starting material and an organic solvent having a low boiling point is used as blowing agent.

THE PRIOR ART

Development of hollow microspheres of carbon has long been desired in view of their usefulness as lightweight material with excellent resistance to heat, chemicals and radioactive-rays, as high-temperature heat-insulating materials, as composite material with metals or inorganic substances, as heat-resistant composite materials with plastics or as structural materials for nuclear reactors and furnaces. There have been a few reports on the production of such hollow microspheres. The processes already reported have, however, several shortcomings such as the use of a special starting material, the lack of uniformity in the quality of the resulting product and the expensive production costs. The purpose of this invention is not only to entirely overcome said shortcomings of the known products but also to provide for the first time suitable hollow microspheres on a commercial scale.

SUMMARY OF THE INVENTION

Briefly stated, this invention relates to a process for the production of hollow microspheres of carbon which process is characterized by homogeneously mixing a hard pitch of high aromatic nature and having a softening point of 60–350° C., preferably 100–350° C., a 0–25% nitrobenzene-insoluble moiety and a hydrogen/carbon atomic ratio (referred to hereinafter simply as H/C ratio) by elementary analysis of 0.2–1.0 with an organic solvent, as a blowing agent, having a low boiling point and being compatible with the pitch; dispersing the mixture with the aid of a protective colloid into water as a dispersing medium; removing, if necessary, some solvent from the resulting microspheres to adjust the solvent content therein to 0.2–10%, and then flash-heating the microspheres to cause foaming as well as rendering the microspheres hollow. The hollow microspheres are then rendered infusible by heating them with an oxidizing gas or liquid, and baking them in an inert gas atmosphere to carbonization at a temperature of 600–2000° C.

DETAILED DESCRIPTION OF THE INVENTION

The pitch used in this invention as starting material for the hollow microspheres is a hard pitch of high aromatic nature having a softening point of 60–350° C., preferably 100–350° C., a 0–25% nitrobenzene-insoluble moiety and a H/C ratio of 0.2–1.0. The softening point of the pitch referred to herein is defined as the temperature at which the pitch begins to be fluidized, the temperature itself being determined by an ordinary flow-tester under pressure of 200 kg./cm.$^2$. By nitrobenzene-insoluble moiety it is meant the ratio of the amount of pitch insoluble in nitrobenzene to the total amount of the pitch when one part of the pitch is mixed with 100 parts of nitrobenzene and heated in boiling water. A pitch having a softening point below 60° C. is unsuited for the purpose of this invention since the hollow microspheres formed are easily susceptible to melt-adhesion during the foaming, thus making subsequent the infusibility treatment difficult. The use of a pitch having a softening point above 350° C. or a more than 25% nitrobenzene-insoluble moiety does not result in uniform hollow microspheres since such pitch is hardly mixed homogeneously with an organic solvent having a low boiling point and used as blowing agent, thus causing a heterogeneous dispersion during the dispersion treatment and uneven foaming during the foaming step. Pitches which fulfill the desired requirements are those obtained by removing low molecular weight components or oily components by distillation or extraction from a tar formed as by-product during the production of olefins by subjecting petroleum hydrocarbons such as crude oil, asphalt, heavy oil, light oil, kerosene, naphtha and the like to flash heat treatment at 700–2500° C. for 0.001–2 seconds. It is also possible to obtain a pitch useful for this invention from coal tar by adequate heat treatment followed by the removal of the low molecular weight components.

The blowing agent used in this invention is an organic solvent having a low boiling point from room temperature to about 150° C. and compatibility with the pitch. Typical suitable blowing agents are aromatic hydrocarbons such as benzene, toluene and xylene, halogenated hydrocarbons such as carbon tetrachloride, chloroform and ethylene dichloride, ethers such as tetrahydrofuran and butyl ether, aliphatic hydrocarbons such as pentane, hexane and heptane, and cycloaliphatic hydrocarbons such as cyclopentane and cyclohexane.

In general, benzene and toluene are most suitable because of compatibility, boiling point and cost. The amount of the solvent used as blowing agent varies according to the density of the hollow microspheres desired, amounts of 0.2–10% by weight based on the pitch being generally preferred.

It is very important to mix the pitch with the blowing agent quite thoroughly and homogeneously in the first step of the production of the hollow microspheres. If the mixture is not homogeneous, it will result in extreme irregularity of the microspheres during dispersion and cause uneven foaming in the foaming step. When the pitch and the solvent are mixed by stirring in a stirring tank, it is generally desirable to stir the pitch after heating it up to the temperature at which the viscosity of the pitch decreases below $10^4$ poises. If it is difficult to decrease the viscosity of the pitch below such value, kneading with a pressure kneader, roll, mixer, or the like is also effective.

Suitable to obtain well suspended or dispersed particles is a process which comprises pouring into an autoclave the pitch containing evenly the low boiling point solvent into water containing a dispersing agent, or alternatively, adding water containing a dispersing agent to a mixture of pitch and solvent, heating the mixture to a temperature at which the viscosity of the solvent-containing pitch decreases to 0.1–1000 poises, stirring the mixture at a high speed, cooling the dispersion below the softening point of the solvent-containing pitch after dispersion has reached its equilibrium state, and then separating the particles from the water as a dispersion medium by means of a centrifuge separator. Microsphers having a diameter of 5–500µ are thus obtained.

Utilizable as dispersing agent are protective colloids, i.e. water-soluble, high molecular weight compounds such as partially saponified polyvinyl acetate, polyvinyl alcohol, methyl cellulose, carboxymethyl cellulose, polyacrylic acid and its salts, starch, konjak flour, gum arabic, gelatin, and equivalents. If necessary, a mixture of two or more dispersing agents or a combination of dispersing agent with other surfactants can be used to control the dispersing effect. In general, the amount of the dispersing agent used is preferably 0.01–5% by weight in water.

The proportion of the solvent-containing pitch to water is preferably in the range of from 1:1 to 1:3 on a weight ratio.

When the pitch having a softening point above 150° C. is used in the operation as described above, it is desirable to use the solvent having a low boiling point in an amount greater than that needed for foaming (0.2–10%), in order to depress the dispersion temperature in the dispersing step and prevent an increase in pressure. In this case, however, it will be necessary to remove the excess solvent prior to the foaming step. Consequently, it is necessary to remove the solvent at a temperature below the softening point of the mixture of pitch and solvent until the amount of the solvent is decreased to 0.2–10%. A rotary kiln, rotary dryer or the like is suitable for removal of the solvent.

The foaming step is performed by exposing the solvent-containing pitch to a temperature above the boiling point of the solvent used and near the softening point of the pitch or by flash-heating the pitch thereby attaining vaporization of the solvent in the microspheres. However, if the temperature is too high or the flashing is too rapid in this process, there might occur a collapse or a melt adhesion of the microspheres. On the other hand, if the temperature is too low or the flashing is too slow, foaming is insufficient as to permit the ready diffusion of the solvent out of the particles, leaving only powders of high bulk density. The hollow microspheres of pitch obtained as described above have a bulk density of 0.05–0.4 g./cc. and are kept buoyant in an aqueous solution of soap.

The hollow microspheres, though they are subsequently converted into carbonaceous hollow microspheres by subjecting them to the infusibility and carbonization treatments of the invention, may be used as such for various purposes such as, for example, as lightweight heat-insulating materials, warming materials, composite materials and the like. The hollow microspheres of carbon which are the end products of the invention can be obtained from the hollow microspheres of pitch by effecting the two additional steps of infusibility and carbonization, described herebelow.

By infusibility treatment it is meant a treatment for preventing melt-adhesion of the hollow microspheres of pitch during their carbonization by baking and is attained by oxidation of the pitch component with an oxidizing fluid, gas or liquid, at a temperature below the softening point of the pitch. A gas such as $NO_2$, $O_2$, $SO_3$, $Cl_2$ or $Br_2$, a gaseous mixture of any such gas with air, nitrogen or argon, or air are effectively used as the oxidizing gas. Similarly, nitric acid, sulfuric acid, a solution of chromic acid or potassium permanganate or the like is effective as the oxidizing liquid.

The final baking step to effect carbonization is performed by thermal treatment of the hollow microspheres at 600–2000° C. for 10–200 minutes in a non-oxidizing atmosphere. By this treatment, the hollow microspheres of pitch are converted into hollow microspheres of carbon with a high carbonization yield of 70–95%. The hollow microspheres of carbon thus obtained have a diameter of 5–1000µ, a wall thickness of 0.5–50µ and a bulk density of 0.05–0.4 g./cc. and may be safely used up to a temperature of 3000° C. or higher in a non-oxidizing atmosphere.

The hollow microspheres of carbon are useful in various fields and are especially suitable as industrial materials such as high-temperature heat-insulating materials, warming materials, composite materials with metals, inorganic substances or plastics, structural materials for atomic piles, and the like.

This invention will be further explained by referring to the following examples:

Example 1 (production of hollow microspheres of pitch)

(1) The production of pitch: A tar component obtained by the pyrolysis of Ceria crude oil for 0.005 second by spraying it into steam heated at 1800° C. was distilled to remove a fraction having boiling point lower than 430° C. The remaining pitch was thermally treated at 320° C. for 5 hours and distilled under reduced pressure of 5 mm. Hg to eliminate low boilers (boiling points lower than 500° C.) to prepare a pitch utilizable as starting material. This pitch had a softening point of 190° C., a 6% nitrobenzene-insoluble moiety and a H/C ratio of 0.56.

(2a) The production of solvent-containing pitch (Example A): A 100 liter autoclave (tolerable pressure: 20 kg./cm.²) equipped with an anchor-type stirring blade was charged with 20 kg. of the pitch (1) and 4.5 kg. of benzene. After replacing air with nitrogen, the autoclave was heated first to 100 C. and, after commencing stirring at 300 r.p.m., to 150° C. The final density at this temperature was 0.01 poise. These operations took 2 hours. The pressure at 150° C. was 5.5 kg./cm.² G. Then 50 kg. of 1% aqueous solution of partially saponified polyvinyl acetate (commercially available product: trade name "Gosenol GH-17;" a product of Nihon Gosei KK) were added and the mixture was stirred at 120° C. for 20 minutes. The density of solvent-containing pitch was 1 poise. The mixture was water cooled to room temperature over 30 minutes. The slurry thus obtained was treated with a bucket-type centrifuge to effect dehydration.

The wet pitch-benzene microspheres were dried at room temperature for 10 hours using a ventilating shelf dryer. The resulting particles, 75% of which were 100–200 mesh (75–147µ) in particle size, contained 7.5% benzene and 3.2% water and had a softening point of 150° C.

(2b) The production of solvent-containing pitch (Example B): The mixing operation under fusion and the dispersing operation were carried as in (2a), except that 4 kg. of toluene were used instead of benzene. The toluene-containing dry particles of pitch thus obtained, 81% of which were 100–200 mesh (75–147µ) in particle size, contained 8.3% of toluene and 2.2% of water and had a softening point of 143° C.

(3) Removal of the solvent: The excess solvent was removed from the solvent-containing microspheres of pitch obtained in step (2a). 5 kilograms of the microspheres were packed in a steam-tube rotary dryer (300 mm.φ x 2,500 mm. L) having a heat-conductive area of 2 m.² and equipped with 8 tubes of 1 inchφ for heating. Hot water, maintained at 85° C., was passed through the tube and nitrogen gas was passed through the inside of the dryer at a rate of 1 m.³/hr. while the dryer was rotated at 4 r.p.m. for 1 hour, thereby effecting the removal of the solvent. The resulting powdery microspheres contained 5.0% benzene and had a bulk density of 0.7 g./cc. and a softening point of 170° C. In a similar manner, the microspheres obtained in step (2b) were heated at 105° C. for one hour to effect the removal of toluene. The resulting powdery microspheres contained 3.7% of toluene and had a bulk density of 0.75 g./cc. and a softening point of 173° C.

(4) The production of hollow microspheres of pitch: The powdery microspheres of pitch containing 5% benzene obtained as described above were continuously fed at a rate of 20 kg./hr. into a column of 300 mm.φ x 5,000 mm. L in which the microspheres were blown up or foamed by an air stream of 150° C. flowing upwardly at a rate of 2 m./sec.

The hollow microspheres of pitch thus obtained had a bulk density of 0.13 g./cc. and a buoyancy in soapy water of 98% by weight.

In a similar manner, the microspheres of pitch containing 3.7% of toluene were foamed at 165° C. to obtain hollow microspheres of pitch having a bulk density of 0.16 g./cc. and a buoyancy in soapy water of 95%.

Example 2 (the production of hollow microspheres of carbon)

(1) 5 kilograms of the hollow microspheres of pitch obtained as described in Example 1 were placed in a rotary oxidizing kiln of 300 mm.φ x 2,500 mm. L equipped with 8 tubes of 1 inch φ and heated, while passing a stream of 2% $NO_2$ gas through the kiln. The heating sequence was: 30 minutes from room temperature 120° C., 45 minutes at 120° C., 15 minutes from 120° C. to 150° C., 45 minutes at 150° C., 30 minutes from 150° C. to 200° C., 30 minutes at 200° C., 20 minutes from 200° C. to 260° C. and finally 60 minutes at 260° C.

The resulting oxidized infusible hollow microspheres of pitch were heated in an electric furnace in a stream of nitrogen gas from 400° C. to 900° C. for 60 minutes, kept at 900° C. for 60 minutes to effect carbonization, then cooled at 300° C. in 60 minutes and removed.

Hollow microspheres of carbon were thus obtained in a char yield of 85%, which had a bulk density of 0.18 g./cc., an average particle diameter of 100μ, a thickness averaging 4μ, and a buoyancy in soapy water of 90% by weight.

(2) The hollow microspheres of pitch obtained as described in Example 1 were treated with a 30% aqueous solution of $HNO_3$ at room temperature for 60 minutes, washed with water and dried.

The resulting oxidized infusible hollow microspheres of pitch were baked to carbonization in a stream of nitrogen as in (1) above. Hollow microspheres of carbon were obtained in a char yield of 79.5%, which had a bulk density of 0.16 g./cc., and a buoyancy in soapy water of 89%.

What is claimed is:

1. A process for the production of hollow microspheres of carbon, which comprises the steps of: mixing a hard, highly aromatic pitch having a softening point of 60–350° C., a 0–25% nitrobenzene-insoluble moiety and a H/C ratio of 0.2–1.0 with a low boiling organic solvent compatible with said pitch; dispersing said mixture into water in the presence of a protective colloid to form microspheres; foaming said microspheres by flash heating to produce hollow microspheres of pitch; treating the microspheres thus obtained with an oxidizing fluid to render them infusible; and then baking the thus treated microspheres to carbonization at temperatures of between 600 and 2,000° C. in an inert gas atmosphere to obtain said hollow microspheres of carbon.

2. The process according to claim 1, wherein said pitch is mixed under heating and stirring with said organic solvent until the viscosity of the pitch is decreased to below $10^4$ poises.

3. The process according to claim 1 wherein the said water dispersion is heated under stirring to a temperature at which the viscosity of said pitch-solvent mixture is 0.1–1000 poises, and wherein said dispersion is then cooled to a temperature below the softening point of the said mixture, after the system has reached the equilibrium state, so that the resulting microspheres are separated from the dispersion system.

4. The process according to claim 1, wherein the ratio of pitch-solvent to water in the dispersion system is 1:1 to 1:3.

5. The process according to claim 1, wherein said organic solvent is selected from the group consisting of aromatic hydrocarbons, halogenated hydrocarbons, ethers, aliphatic hydrocarbons and alicyclic hydrocarbons.

6. The process according to claim 5, wherein said organic solvent is selected from the group consisting of benzene, toluene, xylene, carbon tetrachloride, chloroform, ethylene dichloride, tetrahydrofuran, butyl ether, pentane, hexane, heptane, cyclopentane and cyclohexane.

7. The process according to claim 6, wherein the organic solvent is selected from the group of benzene and toluene.

8. The process according to claim 1, wherein the solvent is removed from the microspheres obtained from the water dispersion until the amount of the solvent left in the microspheres, prior to foaming, is 0.2–10.0% by weight.

9. The process according to claim 1, wherein the protective colloid is one or more of the water-soluble high molecular compounds selected from the group consisting of partially saponified polyvinyl acetate, polyvinyl alcohol, methyl cellulose, carboxymethyl cellulose, polyacrylic acid and its salts, starch, konjak flour, gum arabic and gelatin.

10. The process according to claim 1, wherein the protective colloid is used in combination with a surfactant.

11. The process according to claim 1, wherein the pitch microspheres are heated at a temperature above the boiling point of the solvent and near the softening point of the pitch until the content of solvent in the microspheres is reduced to 0.2–10% by weight prior to foaming.

12. The process according to claim 1, wherein the oxidizing fluid is a gas selected from the group consisting of $NO_2$, $O_2$, $SO_3$, $Cl_2$, $Br_2$, mixtures of said gases diluted with any of air, nitrogen and argon, and air.

13. The process according to claim 1, wherein the oxidizing fluid is a liquid selected from the group consisting of nitric acid, sulfuric acid, and solutions of chromic acid and potassium permanganate.

14. The process according to claim 1, wherein the carbonization treatment is carried out at temperatures of 600–2000° C. for 10–2000 minutes in an inert gas atmosphere.

References Cited

UNITED STATES PATENTS

| | | | |
|---|---|---|---|
| 2,797,201 | 6/1957 | Yeatch et al. | 260—2.5 B |
| 3,264,073 | 8/1966 | Schmitt | 29—182 |
| 3,392,216 | 8/1968 | Otani | 264—29 |
| 3,558,276 | 1/1971 | Otani | 423—449 |
| 3,595,946 | 7/1971 | Joo et al. | 264—29 |

OTHER REFERENCES

Shyne et al. "Chemical Abstracts," vol. 73, Nov. 30, 1970, 110604q.

EDWARD J. MEROS, Primary Examiner

U.S. Cl. X.R.

161—Dig. 5; 260—2.5 B; 264—29, 53; 423—445